(12) United States Patent
Murai et al.

(10) Patent No.: US 7,059,665 B2
(45) Date of Patent: Jun. 13, 2006

(54) CFRP PLATE MATERIAL AND METHOD FOR PREPARATION THEREOF

(75) Inventors: Shoji Murai, Ehime (JP); Tomoyuki Shinoda, Ehime (JP); Takehiko Hirabara, Shiga (JP); Akihiko Kitano, Ehime (JP)

(73) Assignee: Toray Industries, Inc. (JP)

( * ) Notice: Subject to any disclaimer, the term of this patent is extended or adjusted under 35 U.S.C. 154(b) by 0 days.

(21) Appl. No.: 10/482,910

(22) PCT Filed: Aug. 28, 2001

(86) PCT No.: PCT/JP01/07388

§ 371 (c)(1),
(2), (4) Date: Jan. 5, 2004

(87) PCT Pub. No.: WO03/020505

PCT Pub. Date: Mar. 13, 2003

(65) Prior Publication Data

US 2004/0185733 A1    Sep. 23, 2004

(51) Int. Cl.
| B62D 25/00 | (2006.01) |
| B27N 3/10 | (2006.01) |
| D04H 1/00 | (2006.01) |
| B32B 7/12 | (2006.01) |

(52) U.S. Cl. .......... 296/181.2; 296/191; 264/257; 428/292.1; 442/265

(58) Field of Classification Search ......... 296/191, 296/181.2
See application file for complete search history.

(56) References Cited

U.S. PATENT DOCUMENTS

| 4,367,192 | A | * | 1/1983 | Arnason ............... 264/255 |
| 5,001,000 | A | * | 3/1991 | Rohrbacher et al. ....... 428/215 |
| 5,340,520 | A | * | 8/1994 | Strunk et al. .......... 264/171.23 |
| 5,358,779 | A | * | 10/1994 | McGarry ................. 428/301.4 |
| 5,396,932 | A | * | 3/1995 | Homma et al. ......... 139/420 A |
| 5,654,037 | A | * | 8/1997 | Moore et al. ............... 427/379 |
| 6,045,898 | A | * | 4/2000 | Kishi et al. ................. 523/440 |
| 6,247,747 | B1 | * | 6/2001 | Kawanomoto et al. ..... 296/191 |
| 6,410,127 | B1 | * | 6/2002 | Kamae et al. ........... 428/297.4 |
| 6,429,157 | B1 | * | 8/2002 | Kishi et al. ................. 442/227 |
| 2004/0000745 | A1 | * | 1/2004 | Channer ..................... 264/511 |

FOREIGN PATENT DOCUMENTS

| EP | 0 643 996 A1 | 9/1994 |
| JP | 62-68827 A | 3/1987 |
| JP | 01-229605 A | 9/1989 |

(Continued)

OTHER PUBLICATIONS

Viscosity, The Physics Hypertextbook, 1998-2005, pp. 1-7, http://hypertextbook.com/physics/matter/viscosity.*

(Continued)

*Primary Examiner*—Dennis H. Pedder
(74) *Attorney, Agent, or Firm*—DLA Piper Rudnick Gray Cary US LLP

(57) ABSTRACT

A light-weight, highly rigid, high-strength environment-friendly fiber-reinforced plastic (hereinafter, CFRP) board having a surface quality that can endure long-term use suitable for use in automobiles and the like is provided. A method for making the same is also provided. The CFRP board includes a board member formed from a woven fabric as a reinforcing base material, the woven fabric including carbon fibers; and at least one of a gel coat and a paint provided on the board member, wherein the NSIC value of the surface of the CFRP board is 30% or more.

12 Claims, 3 Drawing Sheets

FOREIGN PATENT DOCUMENTS

| | | |
|---|---|---|
| JP | 06-107750 A | 4/1994 |
| JP | 08-112864 A | 5/1996 |
| JP | 2001-139874 A | 5/2001 |
| JP | 2001-322179 A | 11/2001 |

OTHER PUBLICATIONS

Scienceword, Wolfram research, p. 1 of 1, http://scienceworld.wolfram.com/physics/Poise.html.*

* cited by examiner

CFRP PLATE MATERIAL AND METHOD FOR PREPARATION THEREOF

TECHNICAL FIELD

The present invention relates to CFRP boards suitable for use in automobile components and to a method for making the same.

BACKGROUND ART

Carbon fiber reinforced plastic, hereinafter abbreviated as "CFRP", is lightweight, highly rigid, and highly corrosion resistant. Attempts have been made to adapt CFRP to outer panels of various industrial machines and transportation apparatuses such as automobiles. For example, a type of CFRP called a "sheet molding compound" (SMC) is widely used in outer panels of automobiles, such as hoods and fenders.

A sheet molding compound disclosed in Japanese Unexamined Patent Application Publication No. 6-286008 is a slurry intermediate material containing reinforcing fibers, which are short glass fibers several centimeters in length, and a polyester resin or the like. The SMC is heated in a mold and shaped by pressing at a high pressure of 50 or more atmosphere to form a base panel for the outer panel. The surface of the base panel is worked with abrasive paper, a file, or the like so as to make the surface flat and smooth. Subsequently, a color coat is applied to make a CFRP outer panel for automobiles, for example.

Outer panels composed of SMC comprising short reinforcing fibers (discontinuous fibers) have a stiffness lower than that comprising continuous reinforcing fibers. This is not only because the reinforcing fibers are short but also because the elasticity of glass is 70 GPa, which is only one third of the elasticity of steel, which is 210 GPa. Therefore, the thickness of the SMC outer panels is larger than that of metal outer panels. Weight-reduction is thus not necessarily achieved in comparison with metal outer panels, and if there is any weight-reducing effect, it is often very small. Moreover, since fibers of SMC outer panels are discontinuous, SMC outer panels break at the discontinuous portions and thus cannot exhibit high vibration-resistant characteristics, i.e., tensile fatigue/bending fatigue characteristics. In other words, the number of repetitions until breaking under a particular average stress is small. Furthermore, SMC outer panels may be easily perforated and damaged by a local impact such as that caused when an object, such as a rock, flies and hits the SMC outer panel. Accordingly, anti-impact protection measures, such as increasing the thickness or affixing rubber, must be taken for outdoor-use outer panels such as those of transportation apparatuses. Thus, lightweight outer panels that can replace metal outer panels, i.e., environment-friendly automobile outer panels, have not been realized with SMC.

Use of continuous fibers improves the impact-resistance. In particular, use of a continuous-fiber woven fabric having a net structure significantly improves the impact-resistant characteristics. However, since the woven fabric used is heterogeneous and anisotropic, local differences in temperature and moisture absorption over time occur, resulting in generation of microcracks around the surface.

As described above, CFRP outer panels using continuous fiber woven fabrics have many problems and their practical application is few. No reference marks that quantitatively indicate the effect of the surface quality of practical CFRP panels on the structure and the durability have been established to date.

Each company has its own proprietary standard, such as that using a glossmeter or a tension meter, for the surfaces of metal outer panels based on its long experience. However, CFRP has mechanical properties, a hardness, and a linear coefficient of expansion different from those of metal, and the practical standard for the surface is different from that of metal. Simply applying the standard for metal does not provide CFRP outer panels that can withstand practical use.

For example, when a tool or the like drops onto a metal outer panel during production, a dent (permanent deformation) is formed by plastic deformation. The quality of the surface can be easily determined by observation with the naked eye. However, CFRP does not undergo plastic deformation. No dent that recognizable by the naked eye is formed, but separation occurs inside.

Accordingly, examination of dents on the surface using the same standard as that of metal results in overlooking of separation inside the CFRP. The internal separation becomes worse in long-term use, and the quality required for outer panels can be no longer maintained. Moreover, water gathers in the separated portions, thereby increasing the weight. As the temperature rises, evaporation of water pushes out the coating film from the inside, resulting in bulging of the coating film.

The surface quality of outer panels is known to significantly affect not only the long-term durability and merchantability but also the drag with respect to air or water. For the purpose of energy conservation, not only automobiles but also transportation apparatuses in general, such as trains, small aircrafts, boats, and ships, require improvements in surface quality. Generally, when a CFRP outer panel is used to achieve weight reduction, the CFRP outer panel is significantly deformed by air pressure applied during traveling of the transportation apparatus at high speed since the elasticity is lower than that of metal. This results in a large change in drag. In view of the above, the surface of the CFRP should be designed differently from metal materials.

In order to practically apply CFRP outer panels using continuous fibers, a comprehensive technology that is suitable for CFRP outer panels and that can quantitatively indicate the effect of the surface quality on the structure and the durability must be established.

DISCLOSURE OF INVENTION

The problem the present invention aims to overcome is that of impact resistance and durability of a CFRP outer panel using continuous fibers.

In other words, an object of the present invention is to provide a CFRP board, the structure, the material, the surface properties of which are those of a lightweight, highly rigid, high-strength, environment-friendly CFRP external panel having a surface quality that can endure long-time use suitable for used in outer panels of automobiles. A method for making the same is also provided.

In achieving the above-described object, the present invention has following features.

(1) A CFRP board comprising a board member comprising CFRP comprising a woven fabric as a reinforcing base material, the woven fabric comprising carbon fibers; and at least one of a gel coat and a paint provided on the board; wherein an NSIC value (hereinafter abbreviated as "A-value") of a surface of the board is 30% or more.

(2) The CFRP board described in item (1), wherein the NSIC* value (hereinafter abbreviated as "B-value") of the surface of the CFRP board is 10% or more.

(3) The CFRP board described in item (1), wherein X-value (%) o the surface of the CFRP board determined from the A-value and the B-value by Formula 1 is 40% or more:

$$X = 0.6 \times A + 0.4 \times B \quad (1).$$

Figure 1:
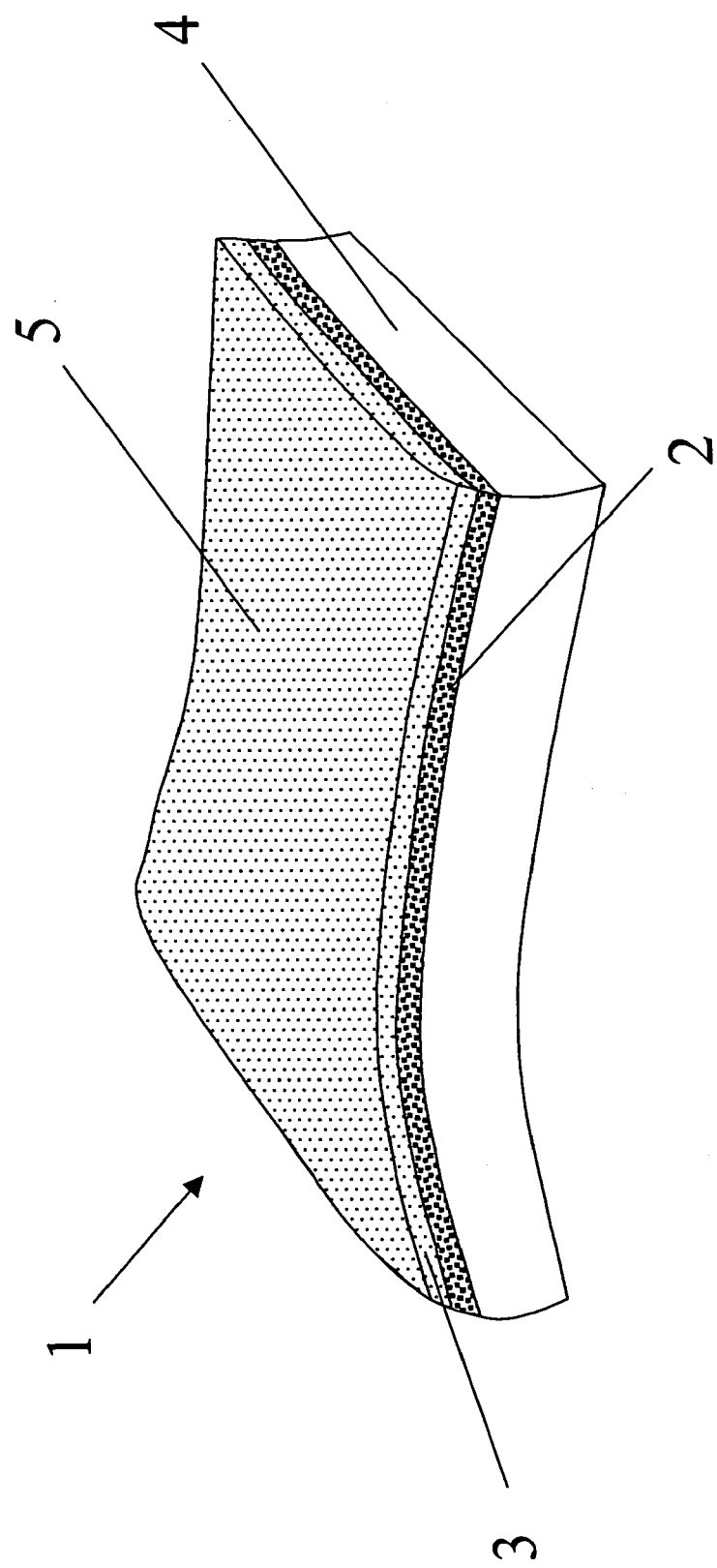
FIG. 1 is a cross-sectional view of a CFRP board according to the present invention.

Reference numeral 1 denotes a CFRP board, 2 denotes a gel coat, 3 denotes a paint, 4 denotes a resin section comprising a continuous carbon fiber woven fabric as a reinforcing material, and 5 denotes a board surface.

BEST MODE FOR CARRYING OUT THE INVENTION

The invention will now be described in detail based on an embodiment of an automobile component shown in FIG. 1. A CFRP board 1 of the present invention includes a resin section 4 as the reinforcing base material. The resin section 4 comprises a continuous carbon fiber woven fabric as the reinforcing material. Here, the term "board" refers to boards having irregularities as well as flat boards.

By using continuous carbon fibers as the reinforcing fibers, high elasticity and high strength, which are the features of carbon fibers, can be achieved. The resistance to dents, the stiffness, and the strength required for outer panels can be achieved while achieving weight reduction. Since fibers are continuous, the perforation impact resistance, which is an important property for outer panels, can be obtained. In other words, the stiffness and impact resistance can be achieved at a small weight not achievable with short single fibers. The deformation resistance, the maximum load, the displacement, and the energy absorption are also excellent.

Since the continuous fibers are woven into a woven fabric, the perforation impact resistance can be improved compared to when unidirectional prepregs are stacked, although the amounts of the reinforcing fibers are the same. In principle, the woven fabric has a structure resembling a net including intersecting fibers and can thus catch objects landing thereto.

Moreover, the physical property of the woven fabric in a first direction is the same as that of a second direction orthogonal to the first direction in one layer (single layer). The number of woven fabric required to form an outer panel can be made smaller than when unidirectional prepregs are stacked, thereby achieving weight reduction. For example, if two prepreg sheets are orthogonally arranged and stacked to make an outer panel, out-of-plane twist deformation so-called saddle deformation occurs by thermal shrinkage during hardening. Moreover, the out-of-plane deformation is caused not only by external force but also by temperature change and is not preferable from the viewpoint of cosmetic appearance and aerodynamics. Use of woven fabrics can solve these problems.

In order to prepare a structure equivalent to that of the woven fabric, at least three (at least four, if prepregs of the same type are used) prepregs must be stacked. Since a lightweight outer panel has a thickness of only several millimeters, woven fabrics are preferred over unidirectional prepregs.

Moreover, use of lightweight, highly elastic, high strength carbon fibers as the reinforcing fibers produces a lightweight outer panel having superior mechanical properties and environmental resistance.

Figure 2:
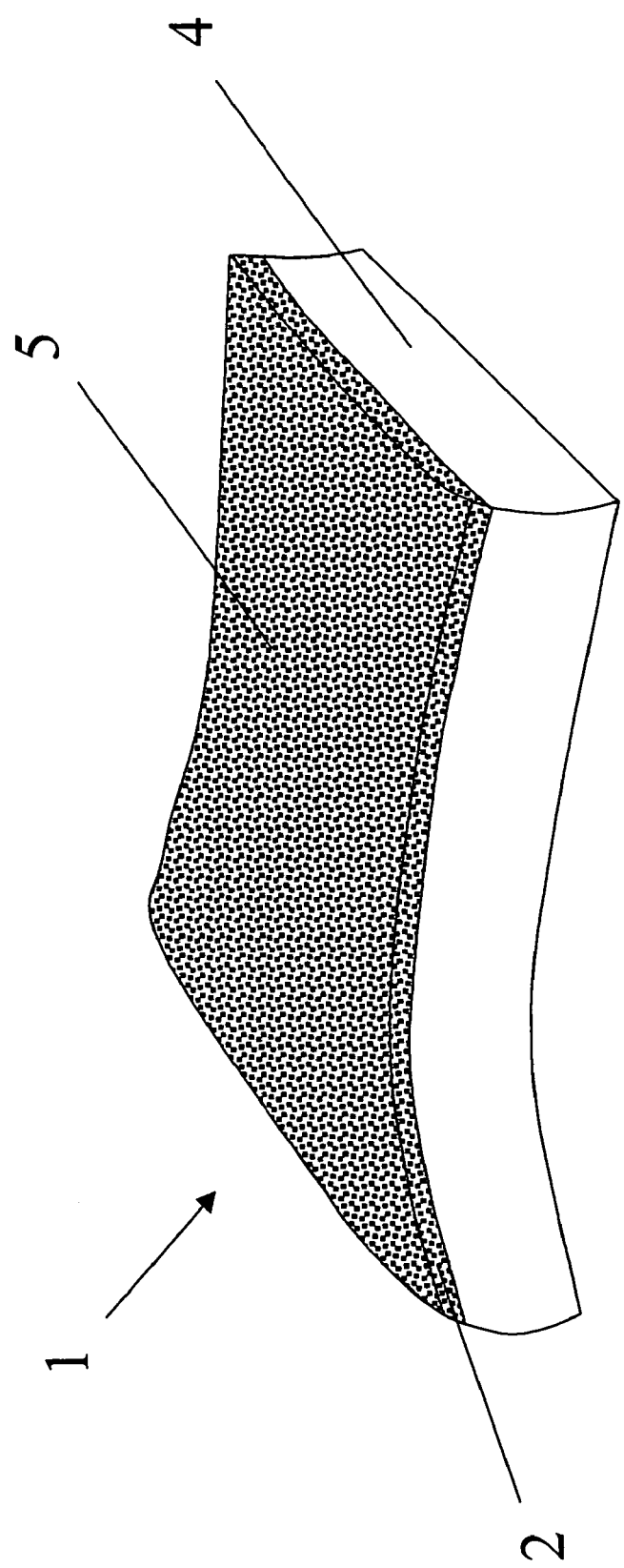
FIG. 2 is a cross-sectional view of a CFRP board according to the present invention.
Figure 3:
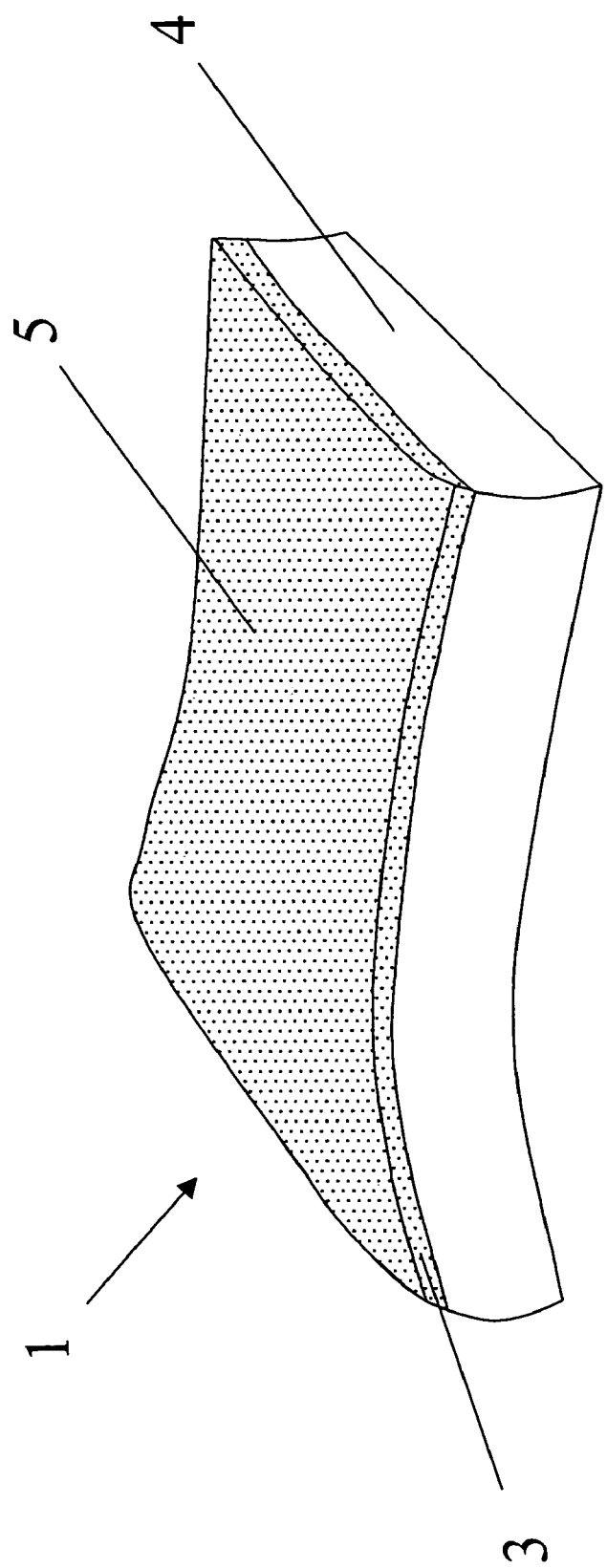
FIG. 3 is a cross-sectional view of a CFRP board according to the present invention.

The CFRP board of the present invention is provided with one or both of the gel coat 2 and the paint 3, as shown in FIGS. 1 to 3. By selecting a suitable gel coat 2 or the paint 3, or a combination of these, characteristics and functions not achieved by the CFRP portion can be provided, and the board can then be obtained function as an outer panel. Examples of such characteristics and functions include surface glossiness, surface irregularities, surface hardness, low/high temperature environment, water resistance, and resistance to UV environment.

Particularly when the CFRP board is to be painted later, the surface of the CFRP board is preferably provided with a resin-rich layer such as a gel coating layer. In this manner, processes, such as surface polishing, sand blasting, or shot blasting, for improving the surface quality do not remove continuous reinforcing fibers during working. Thus, a problem of degradation in mechanical properties such as stiffness and in functional properties such as perforation impact does not occur. The resin-rich layer is not limited to gel coat. The same advantages can still be obtained by forming a matrix resin used in the CFRP or a resin film on the surface of the CFRP board.

When the resin section of CFRP is composed of a resin poorly resistant to UV light, a paint highly resistant to UV light may be applied to provide UV resistance to the outer panel. Paint can produce various cosmetic appearances and is preferred also from the design point of view. The color of the outer panel must be adjusted to match the colors of other components to promote safety, and paint enables delicate color matching. Since defects on the outer panel are not preferable from the cosmetic, aerodynamic, and endurance point of view, the surface hardness thereof must be high. By applying a paint having a high surface hardness, the surface hardness of the outer panel can be improved. Since paint prevents water and light from directly entering the CFRP, a highly durable outer panel having superior environmental resistance and chemical resistance can be obtained.

The durable outer panel of the present invention has a NSIC value (A-value) (%) and a NSIC* value (B-value) (%) that satisfy the requirements below. The two value, namely NISC (A) and NISC* (B), are measured according to ASTM D5767 using a commercially available tester (for example, S89-A available from Suga Test Instruments Co., Ltd. ). Here, A indicates "distortion or dimples", and B indicates "cloudiness or blur". To be more specific, A indicates degradation in image clarity resulting from undulation and inclination on the CFRP board surface. In other words, A indicates micron order irregularities (defects) or residual stress generated at the surface during the formation of the CFRP board. The larger the value of A, the smaller the defects or the residual stress. On the other hand, B indicates degradation in image clarity resulting from scattering and diffusion of light due to reinforcing materials or the like in the CFRP board. The larger the value of B, the lesser scattering and diffusion of light.

The surface 4 of the CFRP board of the present invention has a NSIC (A) of 30 to 100%. The CFRP boards within this range are highly practical boards suitable for use in automobile components and automobile outer panels in particular.

When the surface has defects, the stress concentration at tips of a defect increases according to the size of the defect. When A is less than 30%, breaking progresses from the tips of the defect, and the surface suffers from cracking due to vibration caused to the automobile components during traveling. Thus, the board cannot be used automobile components. When no defect is observed on the surface, A indicates undulation on the surface of the CFRP board. When A is less than 30%, the surface has large undulation and the stress concentration is high. When vibration is applied, the surface cracks. Thus, the board cannot be used in automobile components. Undulation of the surface is caused by the residual stress around the surface resulting from unevenness of temperatures of the mold or atmosphere during the formation of the CFRP.

When an outer panel has significant surface irregularities, foreign matter readily adheres thereto. Preferably, A is 40% or more so as to prevent degradation in flatness and smoothness of the surface and to prevent an increase in drag resulting from deposition of foreign matter. This range corresponds to the limit of the defect size recognizable by human eyes.

When the surface has such defects, chemicals such as car gasoline, kerosene, window washer, thawing agent, neutral washing liquid, acid rain, alkaline washing liquid, engine oil, xylene, toluene, and oxynol, that have crept into the CFRP board from the defect cause swelling. As a result, strength, the elasticity, and the vibration resistance characteristics are degraded, and the board cannot be used in automobile components. Thus, the defects of the surface are preferably as small as possible.

The surface 4 of the CFRP board of the present invention has an NSIC* (B) of 10 to 100%. That B is high does not mean the board is blur-free and is marketable. Since the amount of UV light and infrared light reaching the CFRP board can be decreased, deterioration and a temperature increase due to light can be prevented. When B is less than 10%, UV light and infrared light reaches inside the coating, thereby deteriorating the resin and the filler. Moreover, thermal stress is generated at the interface between the resin and the filler due to a difference in thermal expansion coefficient, and breaking of the surface occurs as a result. This is not preferable for automobile components. Furthermore, the surface suffers from cracking due to vibration caused to the automobile component during traveling, and the board cannot be used in the automobile component. More preferably, B is 30% or more so that a third party can easily recognize the panel visually, thereby promoting safety.

In this invention, the value obtained by the equation X={0.6×A+0.4×B} (%) is defined as the image clarity (X-value) (%). Preferably, both A and B are satisfied in using the CFRP board in automobile components. Most preferably, an X-value (%) of 40% or more is satisfied in addition to these in order to obtain satisfactory mechanical endurance and environmental resistance.

When the value of image clarity is 70% or more, the resulting outer panel has high-class appearance and is thus preferable. For reference, the image clarity can be adapted to metal outer panels as well. However, according to the inventors' investigation, the quality of the metal outer panels varied widely, and the largest number of them had image clarity in the range of 40 to 60%.

The CFRP board of the present invention can be best adapted to automobile components 0.1 to 50 m$^2$ in size from the point of view of durability such as resistance to vibration and to light.

Moreover, the advantages of the CFRP board of the present invention are better exhibited if the CFRP board is used in automobile outer panels from the point of view of cosmetic appearance and aerodynamics.

Continuous carbon fibers are woven into a woven fabric such as plain weave, diagonal weave, or a satin weave. In particular, in the carbon fiber woven fabric of the present invention, the ratio (W/t) of the weight (Wg/m$^2$) to the thickness (t mm) is preferably within the range of 700 to 1,700. Such a woven fabric is called "thin fabric". Despite its weight, the woven fabric is thin and has a structure including dispersed fibers. The undulation in the woven fabric thickness direction is small, and the strength and the stiffness are high. Thus, further weight reduction of the board can be achieved. Moreover, since irregularities on the surface of the woven fabric are small, the surface quality of the board can be improved, and a high A-value can be obtained with a thinner coat. Note that the weight and the thickness of the woven fabric are determined according to Japanese Industrial Standards (JIS) R7602.

When the cover factor of the carbon fiber woven fabric is within the range of 90 to 100%, the portion composed of resin only is decreased. As a result, the out-of-plane impact properties improves and the surface irregularities and non-uniformity of irregularities due to shrinkage in the resin thickness direction are prevented, thereby achieving high A. For perforation impact, taking into consideration a case when the object is a small piece, the cover factor is more preferably in the range of 95 to 100%.

The cover factor Cf (%) of carbon fiber woven fabric is a factor related to the size of voids formed between weaving yarns (the portion composed of only resin), as described and defined in US005396932A. The cover factor $C_f$ is determined from the equation:

Cover Factor $Cf=\{(S_1-S_2)/S_1\} \times 100 (\%)$ wherein $S_1$ is the area of a region set on the woven fabric and $S_2$ is the area of voids between weaving yarns within the area $S_1$.

The woven fabric affects the planar stiffness and the surface quality, which are important properties among the physical properties of the outer panel. Thus, the position of the woven fabric is preferably near the surface of the board. When highly stiff carbon fibers are provided near the surface of the board, the planar stiffness of the board can be increased, and weight-reduction can be achieved. The most preferable position is at the outermost layer. When a multi-axial woven fabric, such as a biaxial or triaxial woven fabric, is provided at the outermost layer, distinct design function of the woven fabric can be shown at the outer panel. Moreover, when a woven fabric having the weight and the thickness that satisfy the ranges described above is placed in the outermost layer, the surface of the board can be made highly flat and smooth, and a high A can be obtained with a thin coat.

The thin woven fabric comprising a carbon fiber woven fabric having a ratio (W/t) of the weight (Wg/m$^2$) to the thickness (t mm) of 700 to 1,700 has fewer irregularities and undulation in the fiber thickness direction. Thus, when the thin woven fabric is formed into a board, the variation in thickness of the resin layer at the surface is small, and a smooth surface can be obtained before and after coating.

When the cover factor is within the above-described range of 90 to 100%, no portion composed of only resin exists in the board thickness direction. Thus, A, which is an important property in view of endurance, is increased, and the practicability is enhanced.

The surface roughness of the mold for the CFRP board is preferably 20 μm or less in forming the CFRP board. The surface roughness Ra (μm) is determined according to the method described in Japanese Industrial Standards (JIS)-B-0610. Generally, when shaping is performed using a mold, the surface of the mold is highly accurately transcribed to the surface of the resin, which becomes the surface of the molded component. When the surface roughness of the molded component made from the CFRP board is 20 μm or less, A, which is an important property in view of endurance, is increased, and the practicability is enhanced. In order to obtain a surface roughness of 20 μm or less, the surface of the mold is preferably polished with a grit #1,000 to #3,000 abrasive paper. More preferably, buffing is performed in addition so as to make the surface roughness 10 μm or less.

As described above, the CFRP board is provided with one or both of a gel coat and a paint. By selecting a suitable gel coat or paint, or a combination of these, characteristics and functions not achieved by the CFRP portion can be provided, and the board can then be obtained function as an outer panel. Examples of such characteristics and functions include surface glossiness, surface irregularities, surface hardness, low/high temperature environment, water resistance, and resistance to UV environment.

More preferably, the thickness of the paint is in the range of 20 to 200 μm. At a thickness exceeding 200 μm, the paint may readily separate, and this is not preferable from the viewpoint of mechanical characteristics and cosmetic appearance. At a thickness less than 20 μm, deterioration may be caused by light such as sunlight directly entering through the coating. Moreover, the applied paint often shows unevenness, thereby degrading design property. Within the above-described range, a CFRP board having high durability can be obtained without increasing the weight. More preferably, the thickness is in the range of 40 to 100

Preferably, the hardening shrinkage coefficient (%) of the resin of the CFRP is 3% or less. Even when the CFRP board comprises carbon fiber woven fabric having a cover factor of 90 to 100%, it is inevitable that the gaps between weaving yarns comprise only the resin. In forming the CFRP board, a difference in hardening shrinkage between these gaps and portions other than these gaps causes the hardening resin to separate from the mold, and the irregularities will be formed on the surface of the CFRP board as a result. When the hardening shrinkage coefficient of the resin of the CFRP is greater than 3%, large irregularities remain on the surface of the CFRP board. Thus, rain or washing liquid remains on the surface as a result of deformation due to temperature change, resulting in nonuniform deterioration of paint due to a lens effect by light such as UV light. Accordingly, the automobile component becomes mottled, which is not preferable. Moreover, UV light decreases the strength and elasticity of the CFRP board over time.

In order to minimize hardening shrinkage during molding, a method of blending an organic or inorganic filler into the resin for forming the CFRP so as to geometrically minimize the hardening shrinkage of the formed component and a method of adding a nonshrinking agent so as to chemically minimize the hardening shrinkage are available.

The linear coefficient of expansion of the resin of the CFRP is preferably $60 \times 10^6$ (1/° C.) or less. In order to shorten the forming cycle, the CFRP board is generally made by adjusting the temperature of a mold to 50 to 150° C. so as to promote hardening of the resin. Thus, when the resin is removed from the heated molding mold and the temperature of the resin decreases from the molding temperature to room temperature, irregularities are formed on the CFRP surface due to a difference in heat shrinkage in the thickness direction between the portion consisting of only resin and portions other than this resin portion. When the linear coefficient of expansion is greater than $60 \times 10^6$ (1/° C.) in the resin of the CFRP, nonuniform deterioration of paint occurs due to the lens effect as described above, and the automobile component becomes mottled as a result, which is not preferable.

An example of a manufacturing method according to the present invention will now be described.

(Base Material Preparation Step)

In the present invention, carbon fibers of a polyacrylonitrile (PAN) system or a pitch system may be used. Polyacrylonitrile carbon fibers are more preferred in making a woven fabric from the viewpoint of balancing strength, elasticity, and elongation. Higher strength and elasticity are preferred for use in outer panels. In order to achieve impact resistance, carbon fibers having an elongation of 1.4% or more are preferred. The elongation is determined according to JIS K-7054. To be precise, the elongation refers to the tensile strength at break.

Continuous carbon fibers are woven into a woven fabric such as plain weave, diagonal weave, or satin weave. In particular, in the carbon fiber woven fabric of the present invention, the ratio (W/t) of the weight (W g/m$^2$) to the thickness (t mm) is preferably within the range of 700 to 1,700.

When the cover factor of the carbon fiber woven fabric is 90 to 100%, gaps formed between weaving yarns are minimized, thereby increasing the out-of-plane impact resistance and eliminating surface irregularities and unevenness due to shrinkage in the resin thickness direction. Thus, high A can be obtained, which is preferable. Taking into account a small piece hitting the board to cause perforation impact, a cover factor in the range of 95 to 100% is more preferred.

In addition to the carbon fibers, inorganic fibers such as glass fibers, alumina fibers, or silicon nitride fibers, or organic fibers such as aramid fibers or nylon may be used. These fibers may be long fibers, short fibers, woven fabric, a mattress, or a combination of these, and may be orderly or disorderly arranged in the carbon fibers or the resin so as to improve the impact resistance and vibration damping characteristic.

Among these fibers, glass fibers are inexpensive and have a superior compression/tension strength balance. The term "glass fibers" refers to fibrous glass known as E glass, C-glass, S-glass, and the like mainly composed of silicon dioxide ($SiO_2$). Preferably, the fiber diameter is approximately 5 to 20 μm. A glass cloth increases the stiffness and holds the resin therein; accordingly, good formability can be obtained. Those having a weight of 20 g/m$^2$ to 400 g/m$^2$ are suitable. When it is used in the surface layer, the weight is preferably in the range of 20 to 50 g/m$^2$ so that the texture of the cloth does not cosmetically affect the design of the CFRP board. Moreover, clarity can be maintained.

The amount of glass fibers is preferably 30 percent by weight or less of the carbon fibers when the strength is required. The amount is preferably 50 percent by weight or less when impact resistance is required.

It should be noted here that organic fibers are ductile and not brittle as with carbon fibers and glass fibers. The organic fibers are flexible and are not easily breakable when bended. When compared to carbon fibers, synthetic fibers have an advantage of not requiring measures against galvanic corrosion since synthetic fibers do not undergo galvanic corrosion.

When compared to glass fibers, organic fibers are advantageous in that they are combustible and can be easily discarded. Furthermore, they have a specific gravity approximately half of that of glass fibers and can significantly reduce the weight of the board. In other words, the weight of automobile components can be reduced.

Sheets of woven fabric comprising the reinforcing fibers described above are cut into a particular shape required for incorporation to the mold to obtain a reinforcing fiber woven fabric base material for forming a CFRP board. The number of the sheets to be stacked is selected according to the structure or appearance.

The CFRP board may have a sandwich structure to improve the stiffness of the CFRP board. Examples of the core material of the sandwich structure include metal sheets composed of steel, aluminum, titanium, or the like; aluminum honeycomb cores; foam materials composed of high-molecular material such as polyurethanes, polystyrenes, polyimides, vinyl chlorides, phenols, acryls, and epoxys; rubber materials; and woody materials. As with the woven fabric, the core material is cut into a shape required for incorporation to the mold so as to be used as the reinforcing base material for forming the CFRP board.

A frame may be provided in part of the CFRP board so as to increase the stiffness of the CFRP board.

(Step of Incorporating Base Material to Mold)

The forming mold is constituted from a bottom force and a top force or a simple top force such as a bagging film.

The top force and the bottom force may be composed of any material. Examples thereof include FRP, cast metal, structural carbon steel, aluminum alloys, zinc alloys, electroformed nickel, electroformed copper, silicon, wood, or synthetic wood. The materials of the top force and the bottom force need not be the same.

It is necessary to perform mold-releasing treatment on the surfaces of the top force and the bottom force. Examples of the mold-releasing agents include silicon based, fluorine based, vegetable oil based, wax based, and PVA based agents. Any agent may be used. When the formed components are to be painted, a fluorine based or a vegetable-oil-based agent is preferably used from the viewpoint of adhesiveness between the base and the paint. Moreover, the mold-releasing agent may be of a baking type or of a spray application type.

In order to provide characteristics and functions not obtainable by the CFRP portion, a gel coat, a paint, or a combination of these is provided on the CFRP board of the present invention. Examples of such characteristics and functions include surface glossiness, surface irregularities, surface hardness, low/high temperature environment, water resistance, and resistance to UV environment. Thus, a gel coating film may be formed on the bottom or top force.

The gel coat may be composed of any synthetic resin. Examples thereof include unsaturated polyester resins, vinyl ester resins, acrylic resins, acryl urethane resins, fluoric resins, silicon resins, and epoxy resins. Among these, unsaturated polyester resins, vinyl ester resins, acrylic resins, acryl urethane resins, fluoric resins, and silicon resins are particularly preferred. This is because they have superior weather resistance and undergo lesser deterioration of properties, such as degradation in mechanical characteristic, of the CFRP board. Moreover, a resin having a small surface hardness is preferred since the treatment time required for surface polishing, sand-blasting, shot-blasting, or the like for improving the surface quality can be shortened.

Moreover, the gel coat can have any color by blending a pigment. For example, a colored clear gel coat can be prepared.

The gel coat can be roughly classified into room-temperature-drying gel coat, high-temperature-hardening gel coat, and UV-hardening gel coat of a two-part type or multi-part type. Examples of methods for forming a gel coat include a spraying method and a method of injecting the resin into the top and bottom forces.

The thickness of the gel coat is preferably in the range of 50 to 500 µm. Below this range, the gel coat film is of no use since surface quality cannot be improved. Above this range, deformation such as warping of the formed component occurs due to a difference in the linear coefficient of expansion between the CFRP and the gel coat layer when cured by heating. Accordingly, such a coat is not suitable for the CFRP board requiring accuracy. Moreover, the gel coat layer may crack or may be wrinkled and is thus not suitable for the CFRP board. More preferably, the thickness of the gel coat is 150 to 400 µm.

Subsequently, the base material of the reinforcing fiber woven fabric is placed in the lower force, and the top force is placed on the bottom force to close the mold.

(Resin Injection Step)

The resin that constitutes the CFRP of the present invention comprises a thermosetting resin such as an epoxy resin, a vinyl ester resin, an unsaturated polyester resin, a phenol resin, a benzoxazine resin, or a urethane resin; a thermoplastic resin such as an acrylic resin, polyethylene, a polypropylene resin, a polyamide resin, an ABS resin, a polybutylene terephthalate resin, a polyacetal resin, or a polycarbonate resin; or a modified resin made by alloying these resins.

Among them, epoxy resins, polyester resins, vinyl ester resins, and modified resins of these resins are particularly preferable in view of resistance to chemicals and weather. Since phenol resins and bezoxazine resins have superior flame resistance and heat-resistance, they are preferable for use in outer panels.

Transparent resins such as acrylic resins and polycarbonate resins are preferred in view of design. In particular, acrylic resins are preferred for its weather resistance. Moreover, 3 to 20% of an antioxidant, UV absorber, or sunlight absorber may be added to these transparent resins so as to enhance the weather resistance.

A non-shrinking resin containing fillers such as talc or glass microparticles or an epoxy resin that barely shrinks by forming of the resin are more preferred since the shrinking during the formation of the resin or shrinking due to heat affect the surface quality.

The base resin and a hardening agent of the above-described resin that constitutes the CFRP are degassed at temperatures higher than the temperature of the mold and are subsequently mixed. The mixture is injected in the top and bottom forces. The injection of the mixture may be performed by any method. Examples thereof include a high-pressure injection method, a low-pressure injection method, or an injection method combining these methods.

The viscosity of the resin to be injected is preferably 500 mPa·s or less. When the viscosity exceeds 500 mPa·s, the entirety of the CFRP board cannot be impregnated with the resin no matter how high the injection pressure. An example of the method for decreasing the viscosity of the resin is heating. More preferably, the viscosity is 300 mPa·s or less.

After completely impregnating the substrate of the reinforcing fiber woven fabric with the resin, the temperature of the mold is increased to a molding temperature of the CFRP board to harden the resin. Subsequently, the resin is removed from the mold to obtain a CFRP board. The molding temperature is preferably 10° C. or more higher than the temperature at which the outer panel is used. The molding temperature is 90° C. or more, and more preferably 110° C. or more for use in automobile outer panels.

The amount of the reinforcing fibers in the CFRP board is preferably 30 to 75% of the resin on a weight basis. When the amount is less than 30%, the weight reduction effect may have to be sacrificed in order to obtain stiffness and impact resistance comparable to those of metal outer panels. The amount is 75% or less because the impregnation of resin is difficult and voids that degrade the physical properties may be formed at an amount exceeding 75%.

The thickness of the CFRP board differs according to use. When the CFRP board is used in outer panels of transportation apparatuses, such as automobiles, traveling on the ground, the thickness is preferably in the range of 0.5 to 8 mm. Below this range, a problem of resistance to perforation may occur. Above this range, the effect of weight reduction is not sufficient.

(Finishing Step)

The CFRP board of the present invention is provided with a gel coat, a paint, or a combination of these in order to render characteristics and functions not achieved by the CFRP portion. Examples of such characteristics and functions include surface glossiness, surface irregularities, surface hardness, low/high temperature environment, water resistance, and resistance to UV environment. The CFRP may be painted.

The paint may be selected from, for example, synthetic resin paints or water-soluble resin paints such as silicon/epoxy resin paint, acrylic resin paint, urethane resin paint, polyester resin paint, epoxy resin paint, fluoric resin paint, cashew resin paint, alkyd resin paint, amino alkyd resin paint, phenol resin paint, oil-based paint, oil varnish, or nitrocellulose lacquer; a primer surfacer; and a primer surfacer putty.

The above-described paints can be roughly classified into air-drying or room-temperature-drying paint, baking paint, UV curable paint, and electron beam curing paint of a one-part type, a two-part type, or a multi-part type. Examples of the methods for application include spraying coating, roll coating, flow-coater coating, and brush coating.

In selecting the paint, a paint composition having good adhesiveness to the resin of the CFRP board is preferable. Since the CFRP board has a UV light resistance inferior to that of metal, paint having superior weather resistance is preferably selected. In particular, a paint so-called sunlight-blocking paint or UV-light-blocking paint is preferably selected. Examples of such a paint include a paint that contains alkyd acryl urethane vehicle and a UV absorber containing carbon black as a pigment or a reduced heteropoly acid or the like; an acryl urethane epoxy silicone paint containing a black pigment such as cobalt oxide, copper oxide, or iron black; and a fluoric paint. In using clear paint, the above-described additives must be used.

A conductive paint containing dispersed conductive fillers such as carbon black, graphite, metal powder, or the like is preferred. Since paint containing tin oxide or an antimony oxide conductive material provides transparent conductive coating, such a paint is preferred in using the design function of the carbon fiber woven fabric or in providing an antistatic effect for preventing adhesion of dust or dirt on automobile outer panels due to static electricity.

A luminescent paint (luminous paint) described in JIS K 5671 may be applied on the entirety or part of the outer panel when the outer panel is used in a transportation apparatus required to attract attention at night.

In order to enhance the durability of the automobile outer panel, a paint resistant to damage inflicted during traveling or washing is preferably used. Effective examples of such a paint include a fluoric paint or an acrylic paint having a low storage modulus G' of dynamic viscoelasticity.

Examples of coating methods include spray coating, e.g., an air gun method or an airless spray method; electrostatic coating, e.g., an electrostatic atomization method or a gun method; electrodeposition, e.g., a cationic method or anionic method; powder coating, e.g., a thermal spraying method, a fluidized-bed coating method, an electrostatic powder coating method; and other known special coating methods.

Among these, an electrostatic coating method at a drying temperature of 120° C. or less using the CFRP board as an anode is preferred for its superior adhesiveness since the CFRP board of the present invention has heat resistance lower than that of metal. The temperature of coating is deeply related to the heat resistance temperature of the outer panel, and coating and drying must be performed at a temperature near the heat resistance temperature. An automobile outer panel has a heat resistance temperature of about 100° C.; accordingly, the temperature of drying the paint is more preferably in the range of 60 to 100° C. The time taken for drying is approximately 3 to 60 minutes. Since carbon fibers are conductive, electrostatic coating is preferred since the utilization ratio of the paint is high.

The thickness of the coating is preferably in the range of 20 to 200 μm. Below this range, light such as UV light may enter the CFRP board and degrade the durability. Above this range, the coating may separate from the CFRP when an impact is applied or during long-term use. More preferably, the thickness of the coating is 40 to 100 μm. In providing the coating of the above-described thickness, the surface of the CFRP board is preferably subjected to degreasing or sanding to remove the mold-releasing agent. The degreasing or sanding process can be omitted by using a non-silicon releasing agent. Moreover, sanding improves the surface quality after coating.

The color of paint is determined in relation to the colors of other components. A color paint is preferred since the amount of UV or infrared light reaching inside the CFRP board can be reduced, and deterioration or a temperature increase due to light can be inhibited. A clear paint does not prevent deterioration or a temperature increase due to light. However, it is preferred for use with the invention CFRP board comprising carbon fiber woven fabric as the reinforcing material since the state of deterioration of the CFRP portion and internal damage can be visually recognized. Since the paint is clear, the conditions of the CFRP can be accurately checked, and a third party having no experience of handling outer panels other than metal outer panels may be motivated to use the CFRP outer panels for this reason. Moreover, clear coating increases the commercial value since it utilizes the design of the woven structure. Note that clear coating may be provided on the entirety or part of the outer panel.

When colored clear coating is provided to make a CFRP board, the state of deterioration and inner damage can still be visually recognized, although the problems of deterioration and a temperature increase due to light remains to some extent.

The representative examples of clear coating include silicon/epoxy coating and acrylic coating. However, the clear coating may comprise urethane, a combination of these coating materials, or an alloy of these coating materials.

In order to achieve required functions such as interlayer adhesion, UV light resistance, and surface hardness, a laminate of a plurality of coating layers, preferably one to four layers, having these functions may be formed at a thickness within the above-describe range. When the number of layers is excessively large, the coating consisting of these interlayer layers suffers from degradation in durability such as interlayer separation resulting from light such as UV light reaching the coating and the CFRP. Accordingly, the required functions are preferably achieved with as few coating as possible.

The above description relates to a resin transfer molding (RTM) method and a finishing method. However, they are for the illustrative purpose only. Any other known molding methods other than the RTM method, such as a hand lay-up method, a prepreg lay-up method, a protrusion method (drawing method), a pull wind method, a filament wind method, a SCRIMP method (an RTM method for forming a sandwich structure in which resin runners of different sizes are disposed in the core material in advance) may be employed.

The board of the present invention may be used in inner or outer panels of transportation apparatuses such as automobiles, high-speed vehicles, high-speed ships, motorcycles, and bicycles. In particular, it can be applied to automobile panels such as doors, hoods, fenders, trunk lids, hard tops (detachable roofs of convertibles), and side mirror covers; vehicle outer panels such as noses of lead coaches, roofs, side panels, and doors; inner panels, outer panels, roofs, floors, and the like of wings of wing trucks; and aero parts of automobiles and motorcycles such as air spoilers and side skirts.

EXAMPLES

An example of the features of the CFRP board of the present invention will now be described by way of EXAMPLES.

Example 1

A stack of five sheets of plain-weave cloth (weight: 200 g/m², thickness: 0.2 mm; cover factor 97%) comprising carbon fibers (elasticity: 235 GPa, strength 5 GPa, elongation: 2.1%) was placed on a male mold surface-finished with a grit #1200 having a shape of an automobile door. A female mold was placed thereon, and the mold was heated to a temperature of 80° C. The plain-weave cloth of carbon fibers was then sufficiently impregnated with a resin supplied from a resin inlet by a RTM method. The resin was a liquid epoxy resin prepared by blending 70 parts by weight of Epicoat 807 (epoxy resin manufactured by Yuka-Shell Epoxy Co. Ltd. ), 30 parts by weight of Epicoat 630 (epoxy resin manufactured by Yuka-Shell Epoxy Co. Ltd. ), and 43 parts by weight of Ancamine 2049 (amine hardener, manufactured by Pacific Anchor Chemical Corporation). The temperature was then increased to 100° C. (step cure) and the resin was cured for two hours and removed from the mold to obtain a CFRP board having a thickness of 1.0 mm. A cross-section thereof was observed. The voids were 1% at most, and the volume content ($V_f$) of fibers was 55%.

This base board was lightly polished with a grit #1200 waterproof abrasive paper and degreased with acetone. Retan PG 80 III (black urethane paint, manufactured by from Kansai Paint Co., Ltd. ) was sprayed onto the base board at room temperature to form a coat 50 μm in thickness. The coat was dried at 80° C. for 30 minutes so as to obtain a CFRP board having A of 40%, B of 40%, and X of 40%.

According to ISO 527-4, a specimen 25 mm in width, 250 mm in length and 1 mm in thickness was prepared from the CFRP board. The specimen was subjected to a partially pulsating tensile fatigue test according to JIS-K 7118. The conditions of the partially pulsating tensile fatigue test were as follows. The maximum stress was 50% of the static tensile stress at break, the minimum stress was 5% of the static tensile stress, and the frequency was 5 Hz. The fatigue test ended when the number (n) of repetition of stress had reached $1\times10^6$ and $1\times10^7$. After the fatigue test, the density of microcracks (number of cracks/cm²) on the surface of the specimen was examined. As for the method of examination, the number of microcracks in a 5-cm square was determined using a dye penetrant (Micro-check, manufactured by Kohzai Corporation) according to the equation:

$$\text{microcrack density} = (\text{number of microcrakes in 1-cm square})/5/5$$

A specimen having a microcrack density of 0/cm² was rated EXCELLENT, a specimen having a microcrack density of 0–1/cm² was rated AVERAGE, and a specimen having a microcrack density of 1 or more/cm² was rated POOR. The specimens having repetition numbers (n) of $1\times10^6$ and $1\times10^7$ were both rated EXCELLENT.

A fatigue-test specimen having 25 mm in width and 250 mm in length was cut out from the CFRP board. The specimen was subjected to an accelerated weather test using a Metaling Weather Meter M6T manufactured by Suga Test Instruments at an exposure intensity of 1.55 kW/m². One cycle consisted of 12 minutes of exposure at an in-layer temperature of 63° C. at a relative humidity of 98% in water spray and 48 minutes of exposure at a black-panel temperature of 63° C. at a relative humidity of 50% without water spray. The cycle was performed 48 times. The microcrack density on the surface of the specimen after the test was determined as above. The specimen was rated EXCELLENT. Furthermore, the specimen after the accelerated weather test was subjected to the partially pulsating tensile fatigue test described above. The microcrack density was determined as above. The specimens having, repetition numbers (n) of $1\times10^6$ and $1\times10^7$ were both rated EXCELLENT.

Example 2

A CFRP board having a thickness of 1.0 mm was prepared by a RTM method as in EXAMPLE 1 except that Retan PG 80 III (clear urethane paint, manufactured by from Kansai Paint Co., Ltd. ) was used instead of Retan PG 80 III (black urethane paint, manufactured by from Kansai Paint Co., Ltd. ). A cross-section thereof was observed. The voids were 1% at most, and the volume content ($V_f$) of fibers was 55%.

The CFRP board had A of 40%, B of 5%, and X of 26%.

The fatigue test, the weather test, and the fatigue test after the weather test were performed on the CFRP as in EXAMPLE 1. The specimens having repetition numbers (n) of $1\times10^6$ and $1\times10^7$ were both rated EXCELLENT in the fatigue test. The specimens after the weather test were rated AVERAGE. The specimens having repetition numbers (n) of $1 \times 10^6$ and $1 \times 10^7$ were both rated AVERAGE in the fatigue test after the weather test.

Example 3

A CFRP board having a thickness of 1.0 mm was prepared by a RTM method as in EXAMPLE 1 except that a semi-transparent blue urethane paint containing 1 part by weight of Retan PG 80 III (clear urethane paint, manufactured by from Kansai Paint Co., Ltd. ) and 99 parts by weight of Retan PG 80 III (blue urethane paint, manufactured by from Kansai Paint Co., Ltd. ) was used instead of Retan PG 80 III (black urethane paint, manufactured by from Kansai Paint Co., Ltd. ). A cross-section thereof was observed. The voids were 1% at most, and the volume content ($V_f$) of fibers was 55%.

The CFRP board had A of 40%, B of 20%, and X of 32%.

The fatigue test, the weather test, and the fatigue test after the weather test were performed on the CFRP as in EXAMPLE 1. The specimens having repetition numbers (n) of $1 \times 10^6$ and $1 \times 10^7$ were both rated EXCELLENT in the fatigue test. The specimens after the weather test were rated EXCELLENT. The specimens having repetition numbers (n) of $1 \times 10^6$ and $1 \times 10^7$ were rated EXCELLENT and AVERAGE, respectively, in the fatigue test after the weather test.

Comparative Example 1

A CFRP board having a thickness of 1.2 mm was prepared by a RTM method as in EXAMPLE 1 except that a stack of five sheets of plain-weave cloth (weight: 300 g/m$^2$, thickness: 0.45 mm; cover factor 85%) comprising glass fibers (elasticity: 70 GPa, strength 2.8 GPa, elongation: 4%) was used as the carbon fiber woven fabric base material and that no coating was provided on the board. A cross section was examined. No voids were observed, and the volume content ($V_f$) of fibers was 50%.

The CFRP board had A of 20%, B of 5%, and X of 14%.

The fatigue test, the weather test, and the fatigue test after the weather test were performed on the CFRP board as in EXAMPLE 1. The specimens having repetition numbers (n) of $1 \times 10^6$ and $1 \times 10^7$ were both rated POOR in the fatigue test. The specimens after the weather test were rated POOR. The specimens having repetition numbers (n) of $1 \times 10^6$ and $1 \times 10^7$ were both rated POOR in the fatigue test after the weather test.

Comparative Example 2

A CFRP board having a thickness of 1.5 mm was prepared by a RTM method as in EXAMPLE 1 except that a stack of five sheets of plain-weave cloth (weight: 300 g/m$^2$, thickness: 0.45 mm; cover factor 85%) comprising glass fibers (elasticity: 70 GPa, strength 2.8 GPa, elongation: 4%) was placed after a gel coat prepared by thoroughly mixing 100 parts by weight of white unsaturated polyester gel coat (7W-0012P, manufactured by Ferro Enamels (Japan) Limited) and 1 part by weight of a methyl ethyl ketone peroxide hardening agent (Kayamek M, manufactured by Nippon Kayaku Co., Ltd. ) at 25° C. was applied by a pressure spray gun to a thickness of 300 μm on a male mold surface-finished with a grit #1200 and was hardened at 70° C. for 30 minutes; and that no coating was provided. A cross section was examined. No voids were observed, and the volume content ($V_f$) of fibers was 50%.

The CFRP board had A of 10%, B of 20%, and X of 14%.

The fatigue test, the weather test, and the fatigue test after the weather test were performed on the CFRP board as in EXAMPLE 1. The specimens having repetition numbers (n) of $1 \times 10^6$ and $1 \times 10^7$ were both rated POOR in the fatigue test. The specimens after the weather test were rated EXCELLENT. The specimens having repetition numbers (n) of $1 \times 10^6$ and $1 \times 10^7$ were both rated POOR in the fatigue test after the weather test.

Example 4

A CFRP board having a thickness of 1.3 mm was prepared as in EXAMPLE 1 and COMPARATIVE EXAMPLE 2 by an RTM method except that a stack of five sheets of plain-weave cloth (weight: 200 g/m$^2$, thickness: 0.2 mm; cover factor 97%) comprising carbon fibers (elasticity: 235 GPa, strength 5 GPa, elongation: 2.1%) was placed after the application and the hardening of the gel coat and that no coating was provided. A cross section was examined. The voids were 1% at most, and the volume content ($V_f$) of fibers was 55%.

The CFRP board had A of 50%, B of 30%, and X of 42%.

The fatigue test, the weather test, and the fatigue test after the weather test were performed on the CFRP board as in EXAMPLE 1. The specimens having repetition numbers (n) of $1 \times 10^6$ and $1 \times 10^7$ were both rated EXCELLENT in the fatigue test. The specimens after the weather test were rated EXCELLENT. The specimens having repetition numbers (n) of $1 \times 10^6$ and $1 \times 10^7$ were both rated EXCELLENT in the fatigue test after the weather test.

Example 5

A CFRP board having a thickness of 1.3 mm was prepared as in EXAMPLE 1 by an RTM method except that a stack of five sheets of plain-weave cloth (weight: 200 g/m$^2$, thickness: 0.2 mm; cover factor 97%) comprising carbon fibers (elasticity: 235 GPa, strength 5 GPa, elongation: 2.1%) was placed after a gel coat prepared by thoroughly mixing 100 parts by weight of transparent acrylic gel coat (NR-AC0001P, manufactured by Ferro Enamels (Japan) Limited) and 1 part by weight of a methyl ethyl ketone peroxide hardening agent (Kayamek M, manufactured by Nippon Kayaku Co., Ltd. ) at 25° C. was applied by a pressure spray gun to a thickness of 300 μm on a male mold surface-finished with a grit #1200 and was hardened at 70° C. for 30 minutes; and that no coating was provided. A cross section was examined. No voids were observed, and the volume content ($V_f$) of fibers was 55%.

The CFRP board had A of 60%, B of 40%, and X of 48%.

The fatigue test, the weather test, and the fatigue test after the weather test were performed on the CFRP board as in EXAMPLE 1. The specimens having repetition numbers (n) of $1 \times 10^6$ and $1 \times 10^7$ were both rated EXCELLENT in the fatigue test. The specimens after the weather test were rated EXCELLENT. The specimens having repetition numbers (n) of $1 \times 10^6$ and $1 \times 10^7$ were both rated EXCELLENT in the fatigue test after the weather test.

The test results are summarized in Table 1.

TABLE 1

| | Image clarity | | | Before weather test No. (n) of stress repetitions in fatigue test | | After weather test No. (n) of stress repetitions in fatigue test | | |
|---|---|---|---|---|---|---|---|---|
| | NSIC (A) (%) | NSIC* (B) (%) | X (%) | $1 \times 10^6$ | $1 \times 10^7$ | 0 | $1 \times 10^6$ | $1 \times 10^7$ |
| EXAMPLE 1 | 40 | 40 | 40 | EX | EX | EX | EX | EX |
| EXAMPLE 2 | 40 | 5 | 26 | EX | EX | A | A | A |
| EXAMPLE 3 | 40 | 20 | 32 | EX | EX | EX | EX | A |
| COMPARATIVE EXAMPLE 1 | 20 | 5 | 14 | P | P | P | P | P |
| COMPARATIVE EXAMPLE 2 | 10 | 20 | 14 | P | P | EX | P | P |
| EXAMPLE 4 | 50 | 30 | 42 | EX | EX | EX | EX | EX |
| EXAMPLE 5 | 60 | 40 | 48 | EX | EX | EX | EX | EX |

*EX: EXCELLENT, A: AVERAGE, P: POOR

INDUSTRIAL APPLICABILITY

A CFRP board and a method for making the CFRP of the present invention can achieve following remarkable comprehensive advantages. A board that can be practically used in automobiles of the like may be formed.
1) Since continuous carbon fibers are used, the board is light-weight, high-strength, and highly rigid. Fuel consumption of automobiles can be improved, and emissions of carbon dioxide gas can be reduced.
2) Since woven fabric is used, the board is thin and light weight without warps, and is highly resistant to impact and damage caused thereby. Thus, at the time of automobile collision, safety is secured.
3) Since the board is provided with one or both of gel coat and a paint, an outer panel having environmental resistance and designing ease can be obtained.
4) Since the NISC value (A-value) is 30% or more, the durability and aerodynamic resistance can be improved.
5) Since the NISC* value (B-value) is 10% or more, the board can attract third parties' attention, thereby promoting safety. The environmental durability can also be expected.

The invention claimed is:

1. A CFRP board made by an RTM method comprising: a carbon fiber reinforced plastic member (CFRP) comprising a woven fabric as a reinforcing base material, the woven fabric comprising carbon fibers, wherein the ratio (W/t) of the weight (Wg/m$^2$) to the thickness (tmm) of the carbon fiber woven fabric is within the range of 700 to 1,700, and resin having a viscosity prior to hardening of 300 mPa·s or less and a hardening shrinkage of 3% or less; and
at least one of a gel coat and a paint provided on the member, wherein the A-value of a surface of the CFRP board is 30% or more.

2. The CFRP board according to claim 1, wherein the B-value of the surface of the CFRP board is 10% or more.

3. The CFRP board according to claim 1, wherein an X-value (%) of the surface of the CFRP board determined from the A-value and the B-value by Formula 1 is 40% or more:

$$X = 0.6 \times A + 0.4 \times B \tag{1}$$

4. The CFRP board according to claim 1, wherein the CFRP board is an automobile component having a size of 0.1 to 50 m$^2$.

5. The CFRP board according to claim 1, wherein the CFRP board is an automobile outer panel.

6. The CFRP board according to claim 1, wherein the cover factor of the carbon fiber woven fabric is 90 to 100%.

7. The CFRP board according to claim 1, wherein the carbon fiber woven fabric is located at an outermost layer of the board.

8. The CFRP board according to claim 1, formed from a mold having a surface roughness of 20 μm or less.

9. The CFRP board according to claim 1, wherein the thickness of the paint is in the range of 20 to 200 μm.

10. An automobile outer component made from the CFRP board of claim 1, wherein the hardening shrinkage coefficient of the resin is 3% or less.

11. The CFRP board according to claim 1, wherein the linear coefficient of expansion of the resin is $60 \times 10^{-6}$/° C. or less.

12. An RTM method for making a CFRP board comprising:
impregnating a woven fabric comprising carbon fibers with resin having a viscosity prior to hardening of 300 mPa·s or less and a hardening shrinkage of 3% or less;
causing the resin to harden and form a board member comprising CFRP; and
applying at least one of a gel coat or a paint on the board member, wherein the A-value of a surface of the CFRP board is 30% or more.

* * * * *